United States Patent
Pancoast et al.

(10) Patent No.: US 8,331,189 B1
(45) Date of Patent: Dec. 11, 2012

(54) TAMPER-PROTECTED DRAM MEMORY MODULE

(75) Inventors: Eric T. Pancoast, Langhorne, PA (US); James N. Curnew, Medford, NJ (US); Scott M. Sawyer, Mt. Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 275 days.

(21) Appl. No.: 12/787,804

(22) Filed: May 26, 2010

(51) Int. Cl.
*G11C 5/14* (2006.01)

(52) U.S. Cl. .......... 365/226; 365/228; 365/189.09; 365/241; 365/149

(58) Field of Classification Search ............ 365/226, 365/228, 189.09, 241, 149
See application file for complete search history.

(56) References Cited

U.S. PATENT DOCUMENTS 7,852,701 B1 * 12/2010 Trimberger .......... 365/228

OTHER PUBLICATIONS

Halderman, Alex et al.; "Lest we remember: cold-boot attacks on encryption keys"; Communications of the ACM—Security in the Browser; May 2009, pp. 91-98; vol. 52, Issue 5; ACM, New York NY.
Locke, Dave; "Protecting the key is the key to secure communications" RF Design Magazine (formerly RFDesign.com), Apr. 1, 2008.

* cited by examiner

*Primary Examiner* — Thong Q Le
(74) *Attorney, Agent, or Firm* — Howard IP Law Group, PC

(57) ABSTRACT

A dynamic memory module is fitted with a tamper detection circuit and a memory clear circuit responsive to a detected tampering signal for clearing the memory. A power retention circuit powers the memory, the tamper detection circuit, and the clearing circuit in the event that the main power fails. Failure of the main power or a System Reset may also initiate memory clearing.

12 Claims, 4 Drawing Sheets

TAMPER-PROTECTED DRAM MEMORY MODULE

BACKGROUND

Protection of computer data is very important, and various encryption schemes have been proffered to make it difficult to improperly extract computer data. Some of these encryption schemes protect the data while in transit between or among computers, and others encrypt the data stored in nonvolatile memory so that a person improperly in possession of a computer cannot extract plain-text information from the stored data.

It has recently been shown in an article by J. Alex Halderman et al. of Princeton University, entitled "Lest We Remember: Cold Boot Attacks on Encryption Keys" (http://citp.princeton.edu/memory/) that attacks on encrypted data stored in a computer are very easy, and require little time or equipment. The article states in part > "Contrary to popular assumption, DRAMs used in most modern computers retain their contents for seconds to minutes after power is lost, even at operating temperatures and even if removed from a motherboard. Although DRAMs become less reliable when they are not refreshed, they are not immediately erased, and their contents persist sufficiently for malicious (or forensic) acquisition of usable full-system memory images. We show that this phenomenon limits the ability of an operating system to protect cryptographic key material from an attacker with physical access. We use cold reboots to mount attacks on popular disk encryption systems—BitLocker, FileVault, dm-crypt, and TrueCrypt—using no special devices or materials. We experimentally characterize the extent and predictability of memory remanence and report that remanence times can be increased dramatically with simple techniques. We offer new algorithms for finding cryptographic keys in memory images and for correcting errors caused by bit decay. Though we discuss several strategies for partially mitigating these risks, we know of no simple remedy that would eliminate them."

The video accompanying the Halderman et al. article illustrates volatile DIMM memory being sprayed with liquid for cooling, and being removed from a computer. FIG. 1A is a simplified side elevation view of a typical DIMM. The Halderman et al. article also shows the ease with which the volatile Dual In-line Memory Module (DIMM) can be sprayed with a volatile liquid for cooling, and how the DIMM can easily be removed from a computer and placed in another computer with the data in the volatile memory intact. When a computer handles encrypted data, the encryption key is typically stored in volatile memory. Using the Halderman et al. techniques, the encryption key can be extracted from a target computer, and used to decrypt the encrypted data. This makes sensitive computer files or data vulnerable to unauthorized hacking.

In order to use encrypted data stored on a computer, the authorized user must typically enter a keyword or password at start-up to generate a key used to un-encrypt or decrypt the files stored on the nonvolatile memory for execution and use. This key, once generated, is stored in volatile memory, typically Dynamic Random Access Memory (DRAM) in the form of Single In-line or Dual In-line Memory Module(s) (SIMM or DIMM). Often, whenever the computer is powered down, put to sleep, or screen locked, a password must be re-entered in order to resume use of the data; however, the key remains in volatile memory. As mentioned, information has become available to hackers and to tamperers as to how to retrieve the password or key from volatile memory, thereby allowing access to all the information stored in the volatile and nonvolatile memories of a computer.

Improved protection of encrypted information is desired.

SUMMARY

An integrated-circuit memory in-line memory module according to an aspect of the disclosure comprises a volatile memory array, a tamper detection circuit, and a scrubbing circuit operatively associated with, or coupled to, the memory array and to the tamper detection circuit, for clearing the memory array when tampering is detected. The module also includes a main power circuit for powering the memory array, tamper detection circuit, and scrubbing circuit, and an ancillary power circuit operatively associated with, or coupled to, the memory array, to the tamper detection circuit, and to the scrubbing circuit, for powering the memory array, the tamper detection circuit, and the scrubbing circuit when the main power is not available. In a particular embodiment of the module, the ancillary power circuit comprises a capacitor and a unidirectional current conducting device operatively associated with, or coupled to, the main power circuit for, when the main power is available, allowing current to flow to the capacitor for charging thereof, and for, when the main power is not available, preventing flow of current from the capacitor to the main power supply.

DETAILED DESCRIPTION

Figure 1A:
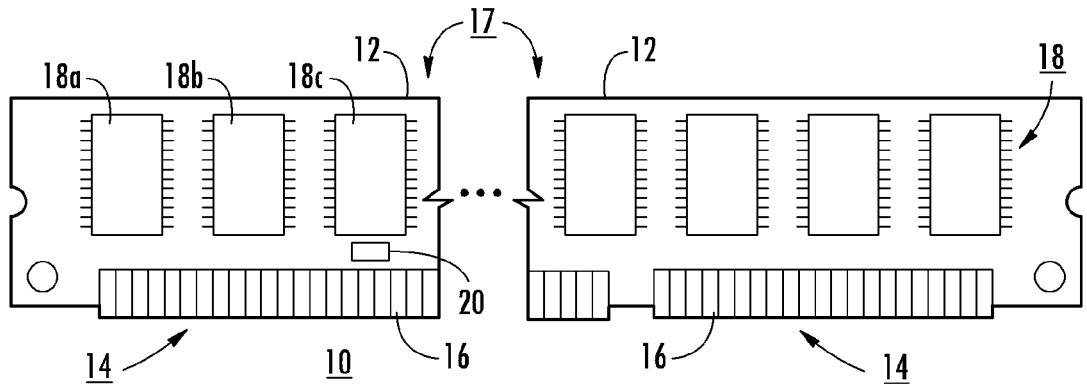
FIG. 1A is a simplified side elevation view of a typical Single or Dual In-line Memory Module (SIMM or DIMM)

In FIG. 1A, a generally rectangular Dual In-line Memory Module (DIMM) 10 includes a printed-circuit board 12 defining a long edge 14 on which an array 16 of edge connectors is mounted, for connecting the module 10 to a computer socket for connectivity and power. The printed-circuit board 12 carries circuitry 17 including a set 18 of Dynamic Random Access Memory integrated circuits 18a, 18b, 18c, . . . , which make connection to the various conductors of the printed-circuit board. Ancillary integrated circuits, one of which is illustrated as a rectangle 20, are also part of circuitry 17 and may also be mounted on the printed-circuit board 12. While memory 10 FIG. 1A is stated to be a Dual In-line Memory Module, it could also be a Single In-line Memory Modula (SIMM), because the appearance of one side of a SIMM is similar to the appearance of either side of a DIMM.

In general, the disclosure contemplates associating with each SIMM or DIMM a protection arrangement or circuit to provide for memory scrubbing, at least in the presence of tampering. The association may be accomplished by mounting the protection circuit or arrangement on the printed-circuit board of the In-line Memory Module. In some embodiments, the protection circuit or arrangement may also scrub the memory at power-down, power-up and/or computer "sleep" mode.

Figure 1B:
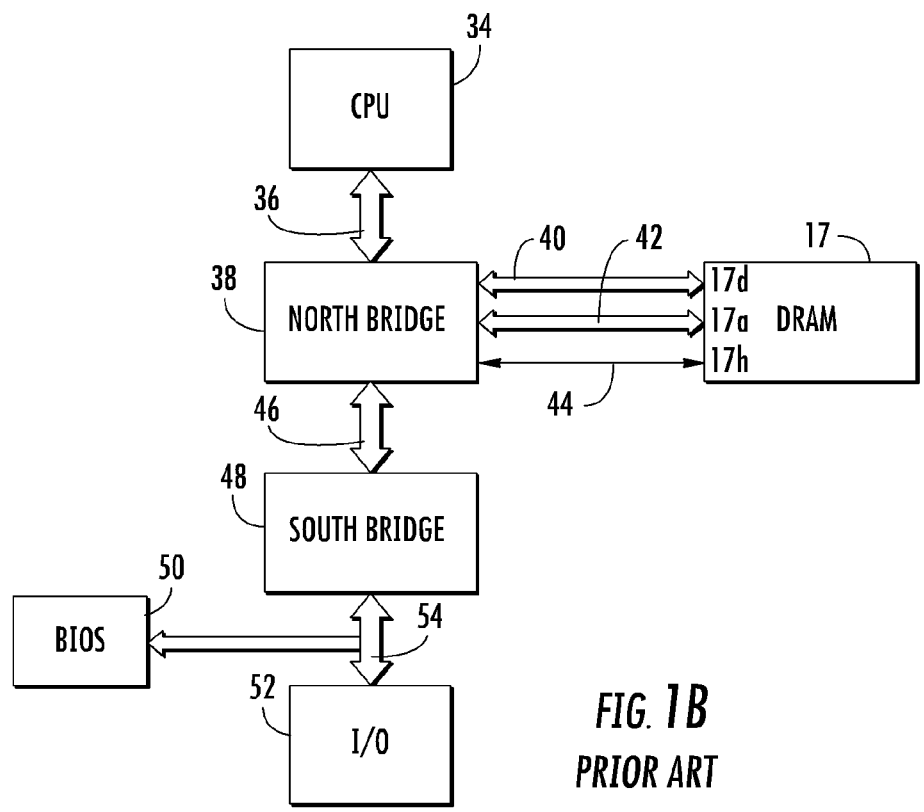
FIG. 1B is a simplified diagram in block and schematic form illustrating portions of a computer including prior-art DRAM.

FIG. 1B is a simplified diagram illustrating portions of a prior-art computer. In FIG. 1B, a central processing unit (CPU) 34 is connected by way of a path or bus 36 with a Northbridge block 38, which is essentially a memory control arrangement. Northbridge block 38 communicates by way of a path or bus 46 with a Southbridge block 48, which is basically an input/output (I/O) controller hub. Southbridge block 48 communicates by way of a bus 54 with a Basic Input/Output System (BIOS) illustrated as a block 50 and with an I/O block 52. I/o block 52 interfaces with common off-computer devices or buses such as serial and parallel ports, keyboard, mouse, USB ports and/or floppy-disk drive. Memory control by the Northbridge 38 involves bidirectional flow of data to and from a data port 17d of a DRAM 17 by way of a data bus 42. The memory addresses are identified by address information flowing to and from an address port 17a of DRAM 17 on a bidirectional bus 42. Handshake signals are communicated between Northbridge 38 and memory 17 by way of a path or bus 44.

Figure 2:
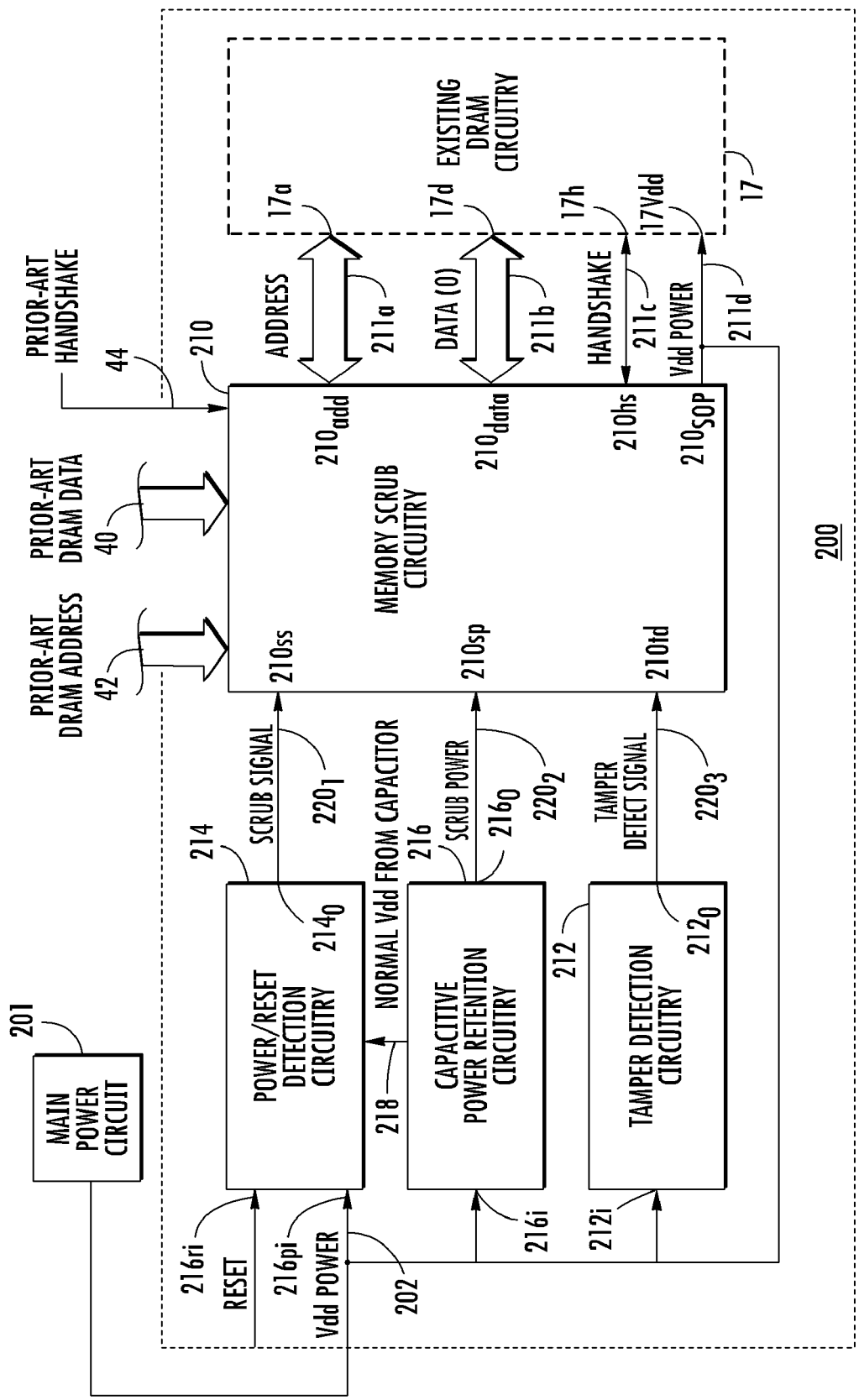
FIG. 2 is a simplified block diagram of a SIMM or DIMM according to aspects of the disclosure, incorporating prior-art DRAM circuitry, and also including tamper detection circuitry, power/reset detection circuitry, a power retention circuit, and a memory scrub circuit operatively associated with, or coupled to, the prior-art DRAM circuitry.
Figure 3:
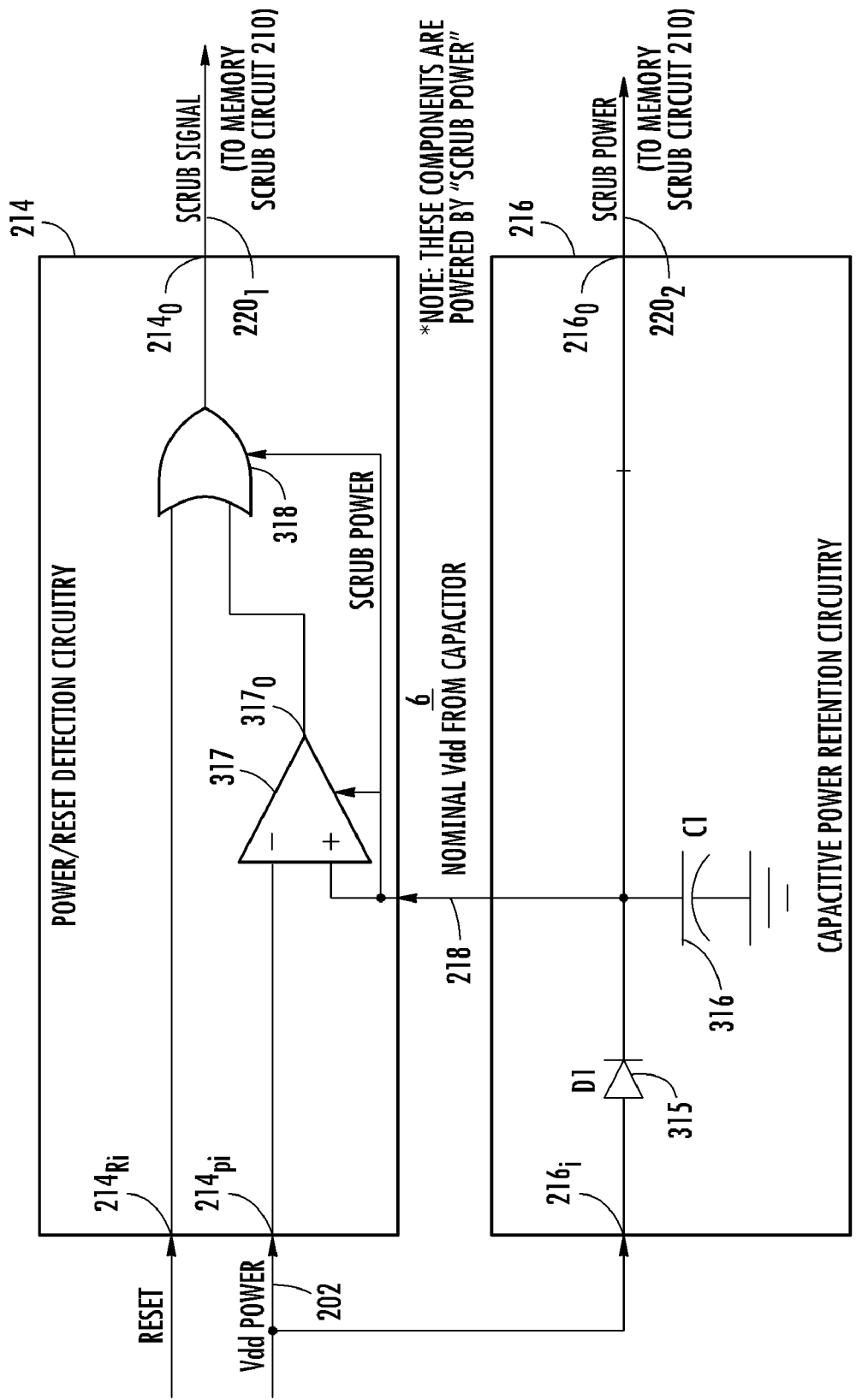
FIG. 3 is a simplified diagram in block and schematic form with illustrative details of the power/reset detection circuitry and of a capacitive power retention circuit.

FIG. 2 is a simplified or top-level diagram in block and schematic form illustrating an Anti-Tamper Protected Memory Module SIMM or DIMM module 200 according to an aspect of the disclosure. In FIG. 2, the existing in-line module is illustrated as DIMM 17. The DRAM In-line Module may be of any type, as for example Double Data Rate (DDR). DIMM 17 in FIG. 2 includes address ports 17a, data ports 17d, and handshake ports 17h. A memory scrub circuit 210 is part of the protected memory module 200. The memory scrub circuit 210 scrubs or zeroes the contents of the DRAM DIMM or SIMM by, when commanded by applying signals to appropriate ports of DRAM circuits 17. Memory Scrub Circuitry 210 responds to tamper detection signals applied to a tamper detection signal port 210td to initiate scrubbing of the DRAM 17. The tamper detection signals originate from an output port 212o of a tamper detection circuit or arrangement 212. Memory Scrub Circuitry 210 also responds to scrub signals applied to a scrub signal port 210td to initiate scrubbing of the DRAM 17. The memory scrub signals originate from an output port 214o of a power/reset detector 214. Under ordinary circumstances, the circuitry 200 of FIG. 2 is powered by Vdd power applied by way of a Vdd Power connection including portions of conductors 202 and 211d to tamper detection block 212, power/reset detector 214, and power input port 17vdd of DRAM 17. Since one of the ways to defeat the tamper resistance according to the disclosure is to cut the power to the protective circuits, a Capacitive Power Retention Circuitry illustrated as a block 216 supplies power, in the absence of Vdd system power from source 201, to power the Memory Scrub Circuitry. The Power/Reset Detection Circuitry in block 214 detects a memory module Reset signal and/or a thresholded drop in Vdd system voltage level, to thereby generate a scrub signal for application to scrub signal input port 210ss of FIG. 2. In response to the application of a scrub signal to port 210ss or of a tamper detect signal to port 210td, the Memory Scrub Circuitry produces signals on paths 211a, 211b, andor 211c for application to DRAM ports 17a, 17d, andor 17h, respectively, to thereby zero or erase all DRAM contents.

the Power/Reset Detection Circuitry in block 214 of FIG. 2 detects a memory module Reset signal applied to its Reset input port 216ri, and/or also monitors the Vdd system voltage level applied over a path 218, to detect a drop in Vdd system voltage level, which might indicate a power-down situation. In response to detection of a Reset signal or a drop in Vdd, the power/reset detection circuitry 214 generates a Scrub signal at its output port 214o. The Scrub signal is applied from output port 214o, by way of a path 220$_1$, to input port 210ss of the Memory Scrub Circuitry 210 of FIG. 2. In response, the Memory Scrub Circuitry 210 produces commands which result in zeroing or erasing all the data in the DRAM 17. FIG. 3 is a simplified diagram in block and schematic form illustrating details of the power/reset detector 214 and the capacitive power retention circuit 216. The Power/Reset Detection Circuitry 214 of FIG. 3 receives the normal DDR DRAM DIMM memory module Reset signal at its input port 214ri. The DDR DRAM DIMM memory module Reset signal is applied to an input port of an OR gate 318. During normal operation, Vdd power is applied to a port 214pi of power/reset detector 214 of FIG. 3, and to a port 216i of Capacitive Power Retention circuit 216. A rectifier or diode 315 in capacitive power retention allows power retention capacitor 316 to charge to a voltage of Vdd−Voffset, where Voffset is the forward voltage drop of the rectifier 315. Thus, under normal conditions, the power retention capacitor 316 is charged to a voltage close to Vdd. In the event of a failure of the main power, voltage Vdd drops to zero volts. Rectifier 315 blocks discharge of power retention capacitor 316 back to the Vdd source, so that power retention capacitor 316 temporarily retains voltage. Thus, when the Vdd power decreases, the voltage Vdd−voffset on capacitor 316 is retained for a period of time at a port 216o and on a path 218, and can be used both (a) to provide a reference voltage indicative of the failure of main power and (b) to energize the scrubbing circuits, respectively. A comparator 317 in the Power/Reset Detection Circuitry 214 receives the power retention voltage by way of a path 218, and compares the power retention voltage across power retention capacitor 312 with the value of Vdd applied to port 214pi to generate a logic HIGH power loss signal at the comparator output 317o. An OR gate 318 in the power/reset detector block 214 ORs the Reset signal with the power loss signal to generate a Scrub signal at port 214o. It should be noted that both comparator 317 and OR gate 318 are powered by retention voltage or "scrub power" from capacitor 316. The Scrub signal is applied by way of path 220$_1$ to the Memory Scrub Circuitry (210 of FIG. 2) to command zeroing of all DRAM memory contents. Thus, comparator 317 compares the nominal module system voltage, Vdd, with the stored nominal Vdd from the power retention capacitor component. If the nominal module system voltage, Vdd, falls below a predetermined threshold determined by comparator 317, thereby indicating a power-down situation, the output of Comparator 317 will go to a HIGH level and, ORed with the Reset signal by OR gate 218, provides the Scrub signal to the Memory Scrub Circuit 210.

It should be noted that the terms "between," "across," and other terms such as "parallel" have meanings in an electrical context which may differ from their meanings in the field of mechanics or in ordinary parlance. More particularly, the term "between" in the context of signal or electrical flow relating to two separate devices, apparatuses or entities does not relate to physical location, but instead refers to the identities of the source and destination of the flow. Thus, flow of signal "between" A and B refers to source and destination, and the flow itself may be by way of a path which is nowhere physically located between the locations of A and B. The term "between" can also define the end points of the electrical field extending "across" or to points of differing voltage or potential, and the electrical conductors making the connection need not necessarily lie physically across or between the terminals of the source. Similarly, the term "parallel" in an electrical context can mean, for digital signals, the simultaneous generation on separate signal or conductive paths of plural individual signals, which taken together constitute the entire signal. For the case of electrical current, the term "parallel" means that the flow of a current is divided to flow in a plurality of separated conductors, all of which are physically connected together at disparate, spatially separated locations, so that the current travels from one such location to the other by plural paths, which need not be physically parallel. In addition, discussions of circuits necessarily describe one element at a time, as language is understood in serial time. Consequently, a description of two interconnected elements may describe them as being in "series" or in "parallel," which will be true for the two elements described. However, further description of the circuit may implicate other interconnected devices, which when connected to the first two devices may result in current flows which contradict the "series" or "parallel" description of the original two devices. This is an unfortunate result of the limitations of language, and all descriptions herein should be understood in that context.

Those skilled in the art will understand that the Tamper Detection Circuitry in block 212 of FIG. 2 can be any type of custom or commercial tamper detection circuit, depending upon the type of application and requirements. One such tamper detection circuit is the Maxim DS3600 secure supervisor chip series, and another is ST Microelectronics M41ST87 security supervisor chip. The Tamper Detection Circuitry simply provides an "tamper detected" input signal to the Memory Scrub Circuitry 210 when a tamper event is detected. The Memory Scrub Circuitry 210 acts to zero out the DRAM memory locations in response to the tamper detected signal.

Figure 4:
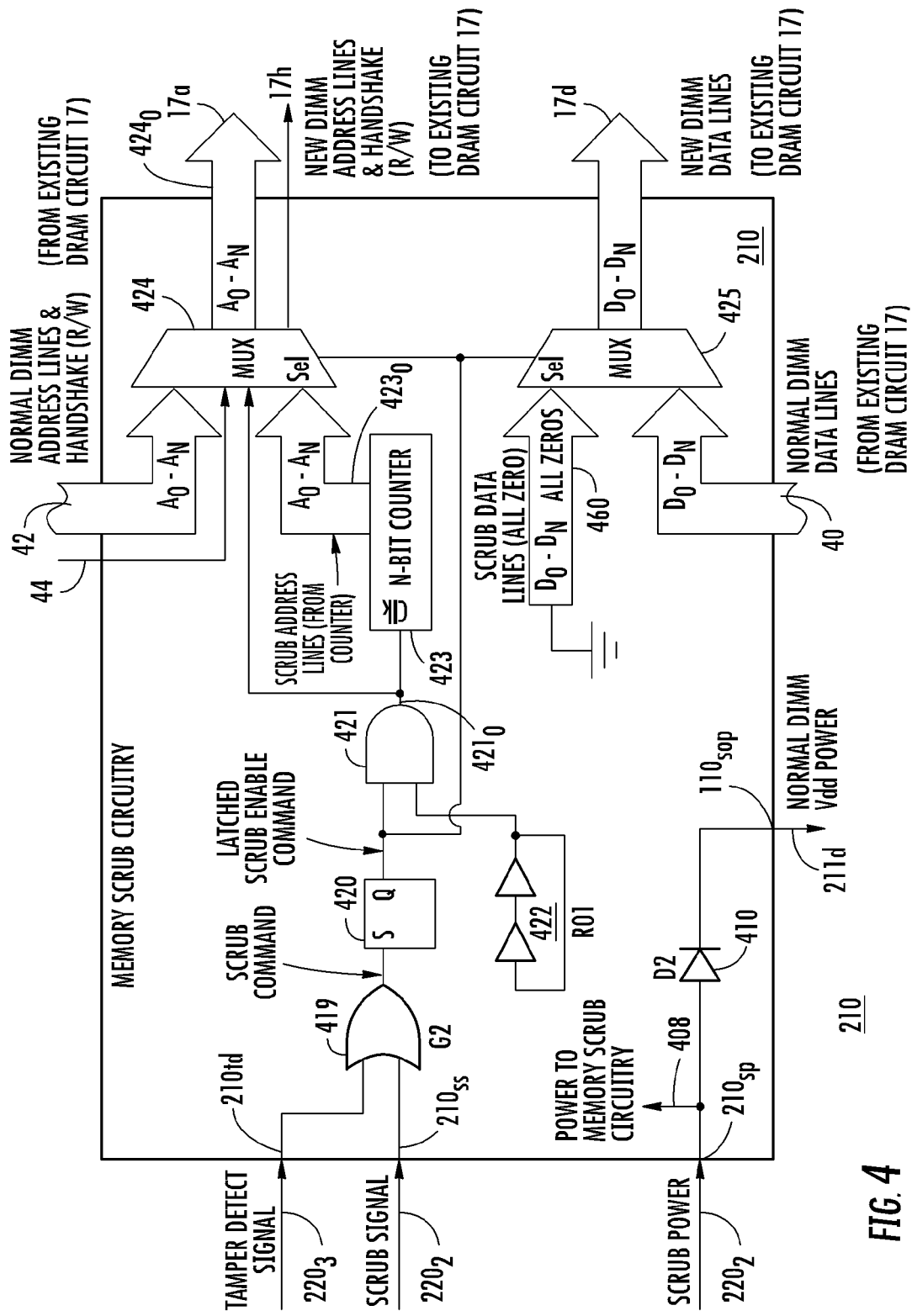
FIG. 4 is a simplified diagram in block and schematic form with illustrative details of the memory scrub circuit.

Details of Memory Scrub Circuitry 210 of FIG. 2 appear in FIG. 4. In FIG. 4, Memory Scrub Circuitry block 210 receives the Tamper Detect Signal at port 210td, the Scrub signal at port 210ss, and the Scrub Power at port 210sp. The Scrub Power applied to port 210sp is applied by a path 408 for powering the Memory Scrub circuitry of block 210, and is also applied through a unidirectional current conducting device or diode 410 to a Scrub Output Power port 210sop, which connects to the normal Vdd power input port 17vdd of DIMM 17. Diode 410 isolates the Memory Scrub Circuit 210 from Normal DIMM Vdd Power. From Scrub Output Power port 210sop the Scrub Power is applied over path 211d to the normal Vdd input port 17vdd of the DRAM circuits (17 of FIG. 2) to be protected. In general, the Memory Scrub Circuitry 210 suspends the normal operation of the protected DDR DRAM SIMM or DIMM and erases (stores a zero in) all DRAM memory locations when either the Tamper Detect Signal at port 210td or the Scrub Signal at port 210ss goes HIGH.

The Tamper Detect Signal applied to port 210td and the Scrub Signal applied to port 210ss of FIG. 4 are ORed by a logic OR gate 419 to develop a Scrub command to the Memory Scrub Circuitry. The Scrub Command is latched to the Q output of a latch 420 until such later time at which a system reset occurs. Latch 420 should power up in a Reset state, thus inhibiting the Memory Scrub function and allowing the DRAM DIMM to operate normally after a system reset.

Erasure of the DRAM memory locations requires a clock signal. The protected DRAM 17 of FIG. 2 requires a clock signal in order to sequence through the memory locations. Since the clock signal generator of the computer in which the protected DRAM is mounted may fail as Vdd drops, Memory Scrub Circuitry 210 of FIG. 4 provides a clock signal generator 422, which may be, for example, a free-running ring oscillator, generating clock signals at a frequency or rate near the maximum write frequency of the system DRAM memories 17. The clock output of oscillator 422 is ANDed in a gate 421 with the Latched Scrub Enable command from Latch 420. AND gate 421 inhibits the Scrub clock signal under normal operation (Scrub Enable command logic LOW). When the Scrub Enable command is logic HIGH, AND gate 421 passes the Scrub clock signal from its output port 4210 to (a) the clock (Clk) input port of a clocked N-bit counter 423 and (b) to an input port of a multiplexer (MPX) 424. Counter 423 is a straight N-bit binary counter, where the DRAM memory size on the subject DIMM module is $2^N$. Counter 423 effectively counts continuously through the DRAM SIMM or DIMM address space when the Scrub clock is present on its Clk input. There is no need to reset Counter 423, since it does not matter where its count starts. The output from AND gate 421 is also used as a memory Write (R/W) Handshake signal for the Memory Scrub circuit and must meet the timing requirements of the DRAM. The data output lines from Counter 423 on path 4230 represent the Scrub Circuit address lines for the DRAM, $A_o$ through $A_N$. These Scrub Circuit address lines are multiplexed through a multiplexer, (MUX) 424, along with the Normal DRAM Address lines, under control of the latched scrub enable signal from latch 420 applied to the Select (Sel) input port of multiplexer 424. The Scrub Enable signal is tapped from the output of Latch 420 and routed to the select (Sel) input of MUX 424 to select the Scrub Address lines. When the Scrub Enable signal is LOW, Normal DRAM Address lines of path 42 are routed through MUX 424 and by way of a path or bus 424o to DRAM 17 (not shown in FIG. 4) for normal DRAM memory operation. The memory Write (R/W) Handshake signals for normal operation (path 44) and for the Memory Scrub operation (from 421o) are also routed through MUX 424 to provide the appropriate memory write (R/W) signals at port 17h of the DRAM. In a similar fashion, the Normal DRAM DIMM Data lines from the normal DRAM circuit (path 40) are routed through MUX 425, with the same Scrub Enable signal routed to its select (Sel) input. The Scrub Circuit Data lines are all tied to zero (ground) as suggested by bus arrow 460 to effectively zero out all DRAM memory locations. Thus, for normal DRAM DIMM operation, the Normal Data lines (40) pass through MUX 425, while in the event of a Scrub Enable, all zeros are routed through MUX 425 to the DRAM memory data input port 17d.

The Scrub Power input (210sp) to the Memory Scrub Circuitry is routed through a diode, D2 (410), to power the DRAM DIMM circuitry during the Memory Scrub operation and to prevent Normal DIMM Vdd Power from backing up through the Scrub Power input ($220_2$) to thereby energize the scrub circuit during normal operating conditions. Memory Scrub will continue (and may cycle through DRAM memory space many times) until either 1) the voltage available from C1 no longer provides enough power for the Memory Scrub and DRAM DIMM circuitry, or 2) until a System Reset occurs. After a System Reset or a Power-Up Reset, the DRAM DIMM will operate under normal conditions. In the event of a subsequent System Reset, a low power condition or a Tamper Detection the subject Anti-Tamper Protected Memory Module's Memory Scrub Circuit will effectively zero out the potentially sensitive data contained in the DRAM memory.

An integrated-circuit memory in-line memory module (17) according to an aspect of the disclosure comprises a volatile memory array (17), a tamper detection circuit (212), and a scrubbing circuit (210) operatively associated with, or coupled to, the memory array (17) and to the tamper detection circuit (212), for clearing the memory array when tampering is detected. The term "coupled to" as used herein contemplates connection which either includes or excludes intermediary elements. The module also includes a main power circuit (201) for (by path 202) powering the memory array (17), tamper detection circuit (212), and scrubbing circuit (210), and an ancillary power circuit (216) operatively associated with, or coupled to, the memory array (17), to the tamper detection circuit (212), and to the scrubbing circuit (210), for powering the memory array (17), the tamper detection circuit (212), and the scrubbing circuit (210) when the main power is not available. In a particular embodiment of the module, the ancillary power circuit (216) comprises a capacitor (316) and a unidirectional current conducting device (315) operatively associated with, or coupled to, the main power circuit (201) for, when the main power is available, allowing current to flow to the capacitor (316) for charging thereof, and for, when the main power is not available, preventing flow of current from the capacitor to the main power supply (201). In a particular embodiment, a further unidirectional current conducting device (410) is coupled for preventing energization of the scrubbing circuit (210) when main power is applied. In one version of a memory module according to an aspect of the disclosure, the ancillary power circuit (216) comprises a capacitor (316) and a unidirectional current conducting device (315) operatively associated with, or coupled to, the main power circuit (201) for, when the main power is available, allowing current to flow to the capacitor (316) for charging thereof, and for, when the main power is not available, preventing flow of current from the capacitor to the main power supply (201). In a preferred embodiment of the disclosure, the volatile memory array comprises a plurality of volatile memory integrated circuits.

What is claimed is:

1. An integrated-circuit memory in-line memory module comprising:
    a volatile memory array;
    a tamper detection circuit;
    a scrubbing circuit operatively associated with, or coupled to, said memory array and to said tamper detection circuit, for clearing said memory array when tampering is detected;
    a main power circuit for powering said memory array, tamper detection circuit, and scrubbing circuit; and
    an ancillary power circuit operatively associated with, or coupled to, said memory array, to said tamper detection circuit, and to said scrubbing circuit, for powering said memory array, said tamper detection circuit, and said scrubbing circuit when said main power is not available.

2. A memory module according to claim 1, wherein said ancillary power circuit comprises:
    a capacitor; and
    a unidirectional current conducting device operatively associated with, or coupled to, said main power circuit for, when said main power is available, allowing current to flow to said capacitor for charging thereof, and for, when said main power is not available, preventing flow of current from said capacitor to said main power supply.

3. A memory module according to claim 1, wherein said volatile memory array comprises a plurality of volatile memory integrated circuits.

4. A memory module according to claim 3, wherein said ancillary power circuit comprises:
    a capacitor; and
    a unidirectional current conducting device operatively associated with, or coupled to, said main power circuit for, when said main power is available, allowing current to flow to said capacitor for charging thereof, and for, when said main power is not available, preventing flow of current from said capacitor to said main power supply.

5. An integrated-circuit memory in-line memory module comprising:
    a volatile memory array;
    a tamper detection circuit;
    a scrubbing circuit operatively associated with said memory array and with said tamper detection circuit, for clearing said memory array when tampering is detected;
    a main power circuit for powering said memory array, tamper detection circuit, and scrubbing circuit; and
    an ancillary power circuit operatively associated with said memory array, said tamper detection circuit, and said scrubbing circuit, for powering said memory array, said tamper detection circuit, and said scrubbing circuit when said main power is not available;
    wherein said ancillary power circuit comprises
    an energy storage device for storing charge when said main power is available; and
    a unidirectional current conducting device for preventing retrograde flow of current from said energy storage device to said main power when said main power is not available.

6. An integrated-circuit memory in-line memory module according to claim 5, further comprising:
    a main power conductive path for applying said main power to a power input port of said memory array for powering said memory array when said main power is available; and
    a unidirectional current conducting device connected to said main power conductive path and to said scrubbing circuit for preventing said scrubbing circuit from being energized when said main power is available.

7. A memory module according to claim 5, wherein said volatile memory array comprises a plurality of volatile memory integrated circuits.

8. A memory module according to claim 6, wherein said volatile memory array comprises a plurality of volatile memory integrated circuits.

9. An integrated-circuit memory in-line memory module comprising:
    a volatile memory array;
    a tamper detection circuit;
    a scrubbing circuit operatively associated with, or coupled to, said memory array and to said tamper detection circuit, for clearing said memory array when tampering is detected;
    a main power circuit for powering said memory array, tamper detection circuit, and scrubbing circuit;
    an ancillary power circuit operatively associated with, or coupled to, said memory array, to said tamper detection circuit, and to said scrubbing circuit, for powering said memory array, said tamper detection circuit, and said scrubbing circuit when said main power is not available;
    a main power conductive path for applying said main power to a power input port of said memory array for powering said memory array when said main power is available; and
    a unidirectional current conducting device connected to said main power conductive path and to said scrubbing circuit for preventing said scrubbing circuit from being energized when said main power is available.

10. A memory module according to claim 9, wherein said volatile memory array comprises a plurality of volatile memory integrated circuits.

11. A memory module according to claim 9, wherein said ancillary power circuit comprises:
   a capacitor; and
   a unidirectional current conducting device operatively associated with, or coupled to, said main power circuit for, when said main power is available, allowing current to flow to said capacitor for charging thereof, and for, when said main power is not available, preventing flow of current from said capacitor to said main power supply.

12. A memory module according to claim 11, wherein said volatile memory array comprises a plurality of volatile memory integrated circuits.

* * * * *